(12) United States Patent
Ananda et al.

(10) Patent No.: US 11,627,553 B2
(45) Date of Patent: Apr. 11, 2023

(54) OPTIMIZED PAGE RECEPTION BASED ON TARGET PAGE MISS RATE FOR IOT DEVICES

(71) Applicant: QUALCOMM Incorporated, San Diego, CA (US)

(72) Inventors: Raghavendra Shyam Ananda, Hyderabad (IN); Alberto Rico Alvarino, San Diego, CA (US); Srikanth Menon, Hyderabad (IN); Praveen Maruthoormana Purushothaman, Ernakulam (IN)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/900,668

(22) Filed: Jun. 12, 2020

(65) Prior Publication Data

US 2020/0396713 A1    Dec. 17, 2020

(30) Foreign Application Priority Data

Jun. 14, 2019   (IN) ............................ 201941023646

(51) Int. Cl.
*H04W 68/02*   (2009.01)
*H04W 52/02*   (2009.01)
*H04W 48/08*   (2009.01)

(52) U.S. Cl.
CPC .......... *H04W 68/02* (2013.01); *H04W 48/08* (2013.01); *H04W 52/0216* (2013.01); *H04W 52/0229* (2013.01)

(58) Field of Classification Search
CPC . H04W 48/08; H04W 48/12; H04W 52/0216; H04W 52/0229; H04W 68/02; H04W 76/28; H04W 68/00; H04W 68/005; H04W 68/08; H04W 68/06; H04W 68/04; H04W 76/27; H04W 52/0235; Y02D 30/70
USPC ........................................................ 455/458
See application file for complete search history.

(56) References Cited

U.S. PATENT DOCUMENTS

| | | | |
|---|---|---|---|
| 9,763,172 | B2 | 9/2017 | Vajapeyam et al. |
| 2015/0173122 | A1* | 6/2015 | Schliwa-Bertling ........................ H04W 52/0235 370/311 |
| 2018/0176883 | A1 | 6/2018 | Fujishiro et al. |
| 2019/0254110 | A1* | 8/2019 | He ...................... H04L 41/0896 |
| 2020/0196242 | A1* | 6/2020 | Höglund ................. H04W 8/08 |

OTHER PUBLICATIONS

3GPP TSG RAN WG1 Meeting #89 R1-1707319 May 2017.*
3GPP TSG RAN WG1 Meeting #89 R1-1707021 May 2017.*
3GPP TSG RAN WG1 Meeting #89 R1-1708072 May 2017.*

(Continued)

*Primary Examiner* — William Nealon
(74) *Attorney, Agent, or Firm* — Danai Nelisile Mhembere; ArentFox Schiff LLP

(57) ABSTRACT

A configuration to enable a base station to adjust an error rate for paging and to advertise such error rate to UEs, in order to optimize or reduce network paging resources. The apparatus determines a target miss rate for paging on a downlink narrowband control channel. The apparatus transmits an indication of the target miss rate to one or more UEs. The indication is transmitted in system information or a dedicated downlink channel.

29 Claims, 13 Drawing Sheets

(56) References Cited

OTHER PUBLICATIONS

International Search Report and Written Opinion—PCT/US2020/037636—ISA/EPO—dated Sep. 25, 2020.
Nokia Networks: "Paging Occasion Calculation for eDRX Operation in Idle Mode", 3GPP Draft, R2-154427, Paging Occasion Calculation for eDRX Operation in Idle Mode, 3rd Generation Partnership Project (3GPP), Mobile Competence Centre, 650, Route Des Lucioles, F-06921 Sophia-Antipo, France, vol. RAN WG2, No. Malmo, Sweden, >Oct. 5, 2015-Oct. 9, 2015, Oct. 4, 2015 (Oct. 4, 2015), XP051004998, 5 pages, Retrieved from the Internet: URL: http://www.3gpp.org/ftp/Meetings_3GPP_SYNC/RAN2/Docs/. [retrieved on Oct. 4, 2015] the whole document.

\* cited by examiner

OPTIMIZED PAGE RECEPTION BASED ON TARGET PAGE MISS RATE FOR IOT DEVICES

CROSS REFERENCE TO RELATED APPLICATION(S)

This application claims the benefit of Indian Patent Application No. 201941023646, entitled "Optimized Page Reception based on Target Page Miss Rate for IoT Devices" and filed on Jun. 14, 2019, which is expressly incorporated by reference herein in its entirety.

BACKGROUND

Technical Field

The present disclosure relates generally to communication systems, and more particularly, to optimizing paging procedures in narrowband devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In wireless communications, base stations and UEs send different notification and paging signals to each other in order to facilitate communication. These signals can help to improve the overall communication system information, as well as to improve the access and control of each device within the wireless system. In some instances, a wakeup signal (WUS) can be sent from a base station to a UE in order to provide notification of an upcoming paging occasion (PO). When sending and receiving multiple WUSs and POs, it can be beneficial to determine a strategy and/or conserve the amount of WUSs and POs that are sent throughout the wireless system. By doing so, the overall power consumption of the wireless system can be improved. However, some UEs, such as narrowband (NB) IoT devices, may experience issues with page reception due to signal fading. Narrowband communications involve communicating with a limited frequency bandwidth as compared to the frequency bandwidth used for LTE communications. The idle mode page reception of NB-IoT devices may be limited by deep signal fading, as such, the network may need to schedule a large number of WUS and/or page repetitions in order for NB-IoT devices to have reliable paging.

The present disclosure allows a base station to adjust its paging miss rate for UEs (e.g., NB-IoT devices) such that UEs may optimize their WUS reception by using less WUS repetitions, which may reduce the amount of resources that the base station may need to schedule in order for NB-IoT devices to have reliable paging.

In an aspect of the disclosure, a method, a computer-readable medium, and an apparatus are provided. The apparatus may be a device at a base station. The device may be a processor and/or a modem at a base station or the base station itself. The apparatus determines a target miss rate for paging on a downlink narrowband control channel. The apparatus transmits an indication of the target miss rate to one or more user equipments (UEs).

In an aspect of the disclosure, a method, a computer-readable medium, and an apparatus are provided. The apparatus may be a device at a UE. The device may be a processor and/or a modem at a UE or the UE itself. The apparatus receives, from a base station, an indication of a target miss rate for a downlink narrowband control channel. The apparatus adjusts a discontinuous reception (DRX) cycle based on the target miss rate for the narrowband downlink control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few

DETAILED DESCRIPTION

Figure 1:
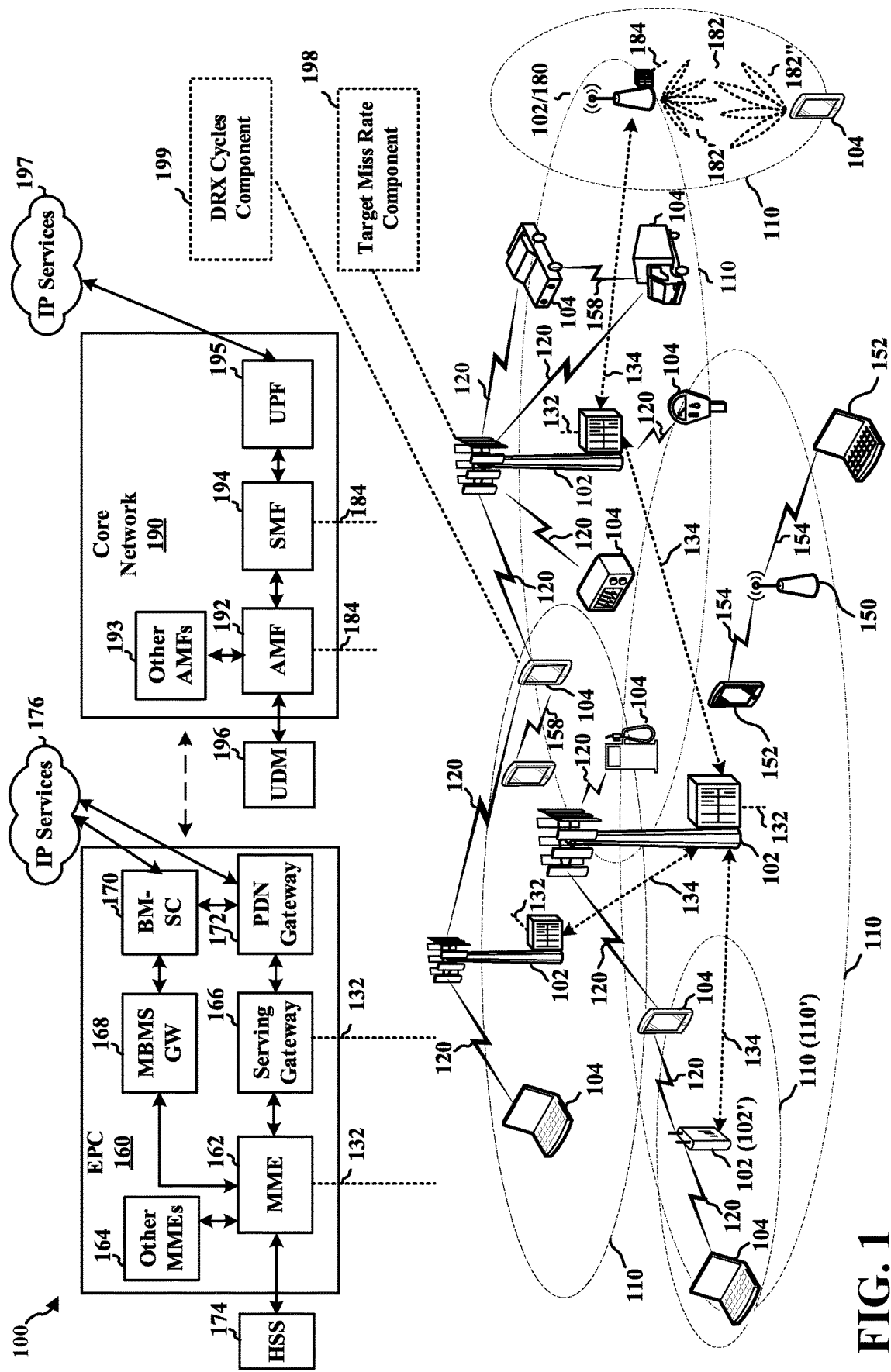
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be configured to enhance the reliability of paging for UEs (e.g., NB-IoT devices) by improving the manner in which UEs perform paging procedures, such that UEs may reduce the number of WUS receptions required to be monitored in a DRX cycle. For example, the base station 102 of FIG. 1 includes a target miss rate component 198 configured to determine a target miss rate for paging on a downlink narrowband control channel. The base station 102 determines a target miss rate for paging on a downlink narrowband control channel. The base station 102 transmits an indication of the target miss rate to one or more UEs.

Referring again to FIG. 1, in certain aspects, the UE 104 may be configured to operate in accordance with the target miss rate determined by the base station and utilize a reduced amount of WUS repetitions, in order to optimize WUS reception. For example, the UE 104 of FIG. 1 includes a DRX cycles component 199 configured to adjust a DRX cycle based on the target miss rate for the narrowband downlink control channel. The UE 104 receives, from a base station 102, an indication of a target miss rate for a downlink narrowband control channel. The UE 104 adjusts a DRX cycle based on the target miss rate for the narrowband downlink control channel.

Although the following description may be focused on NB-IoT, the concepts described herein may be applicable to other similar areas, such as LTE, LTE-A, CDMA, GSM, 5G NR, and other wireless technologies.

Figure 2A:
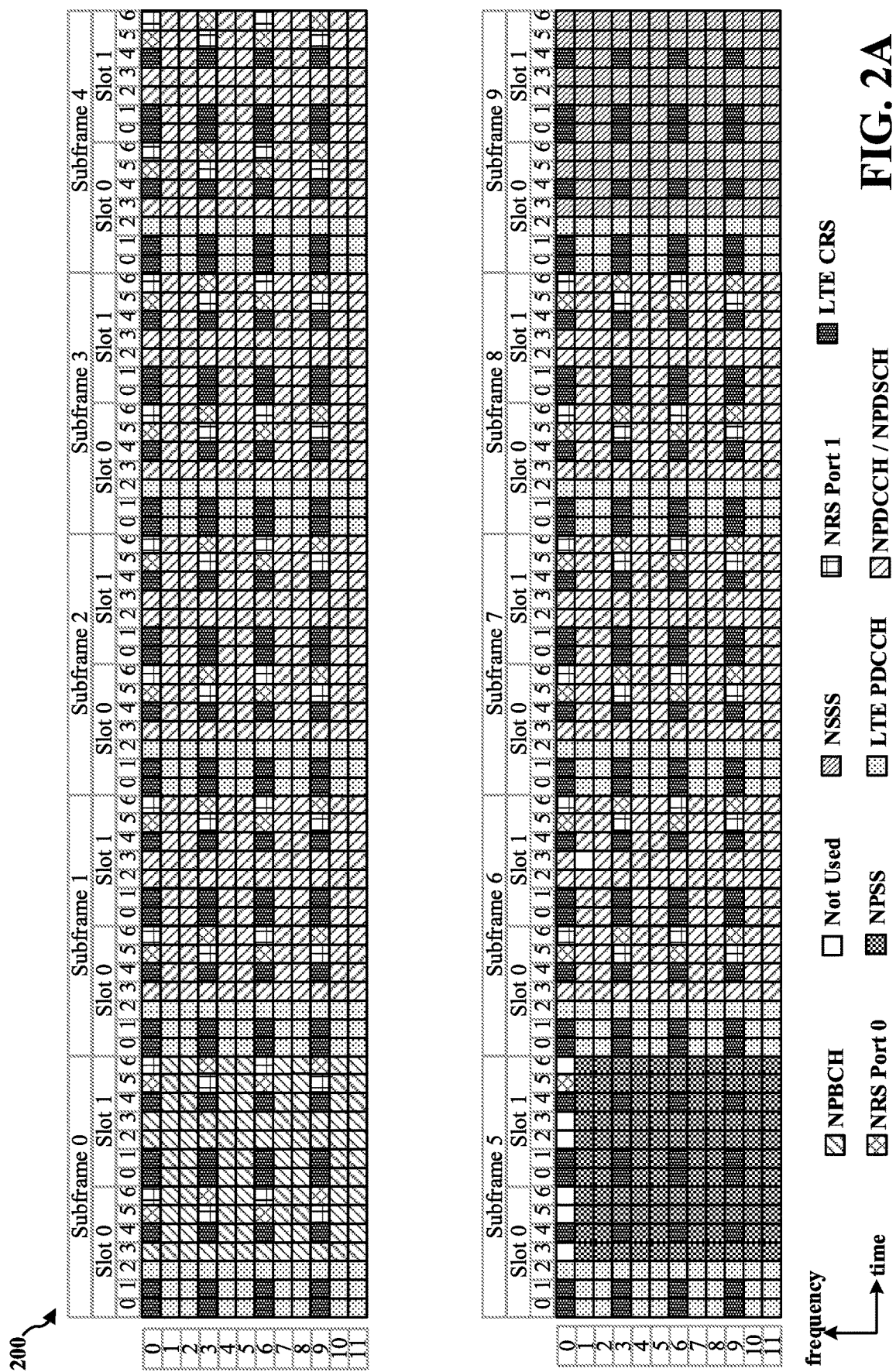
FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/standalone deployment inside an LTE carrier (even radio frame), and an NB frame structure for guard band/standalone deployment inside an LTE carrier (even radio frame), respectively.
Figure 2B:
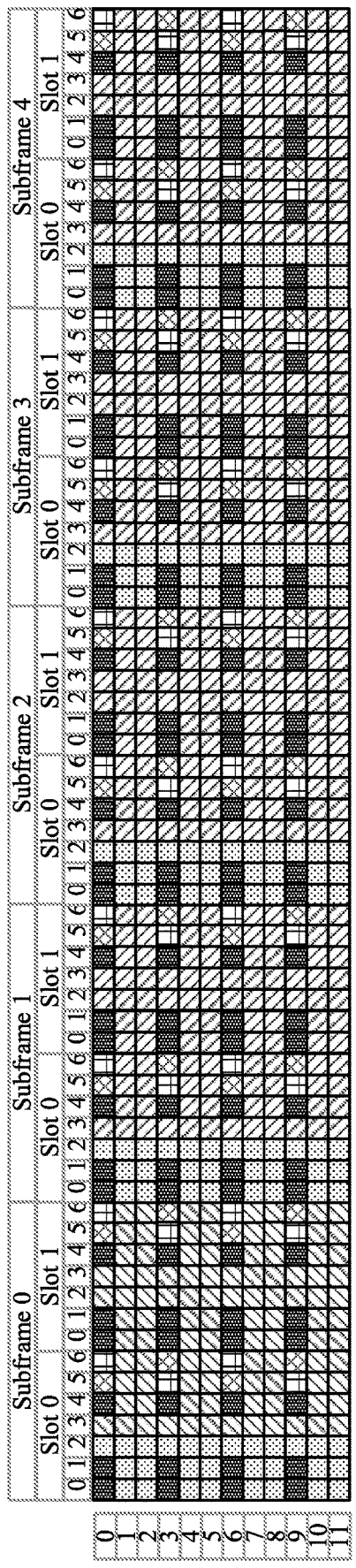
Figure 2B:
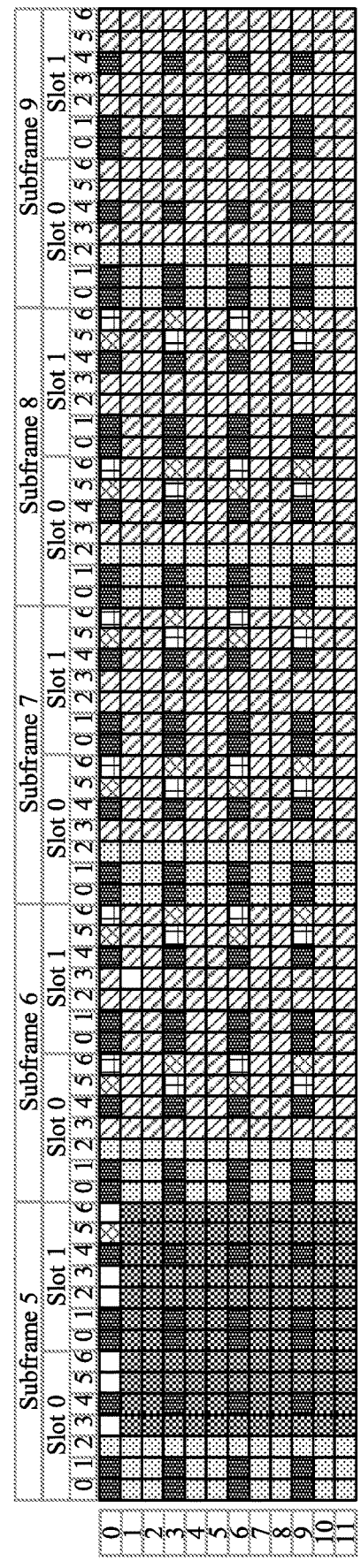
Figure 2C:
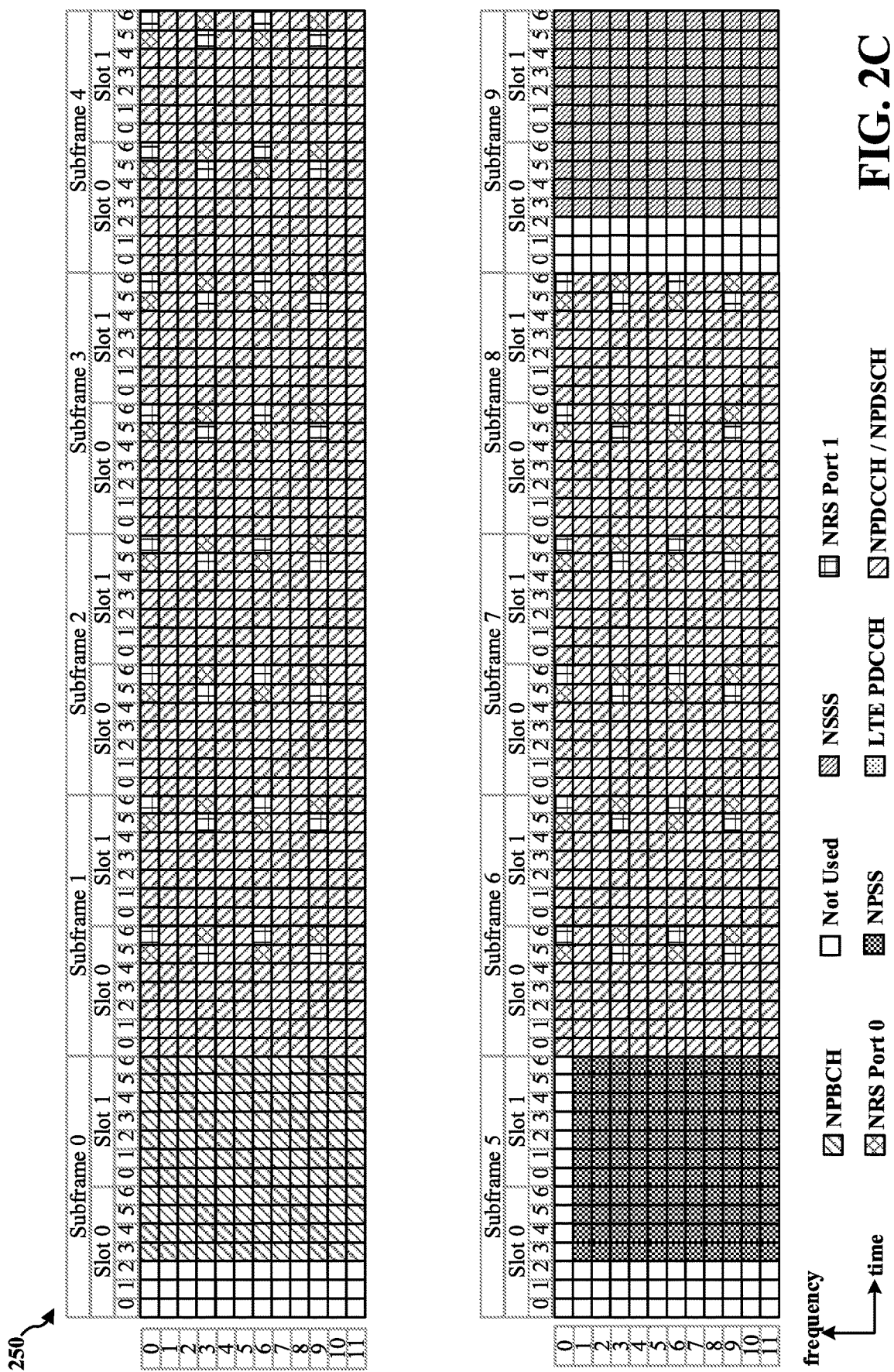
Figure 2D:
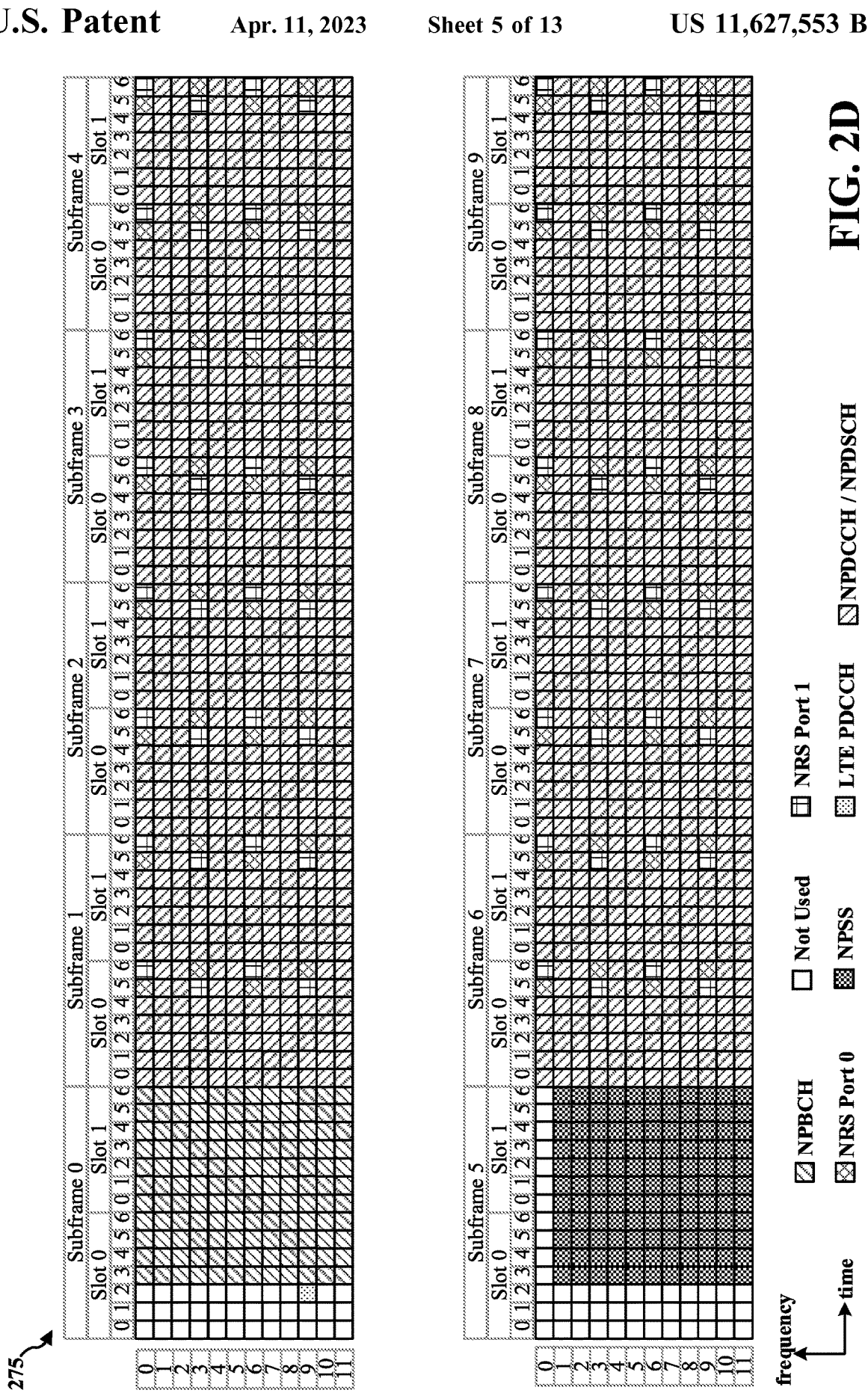

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The standalone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NB primary synchronization signal (NPSS) may be transmitted in subframe 5 of even and odd radio frames, and an NB secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NB physical broadcast channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
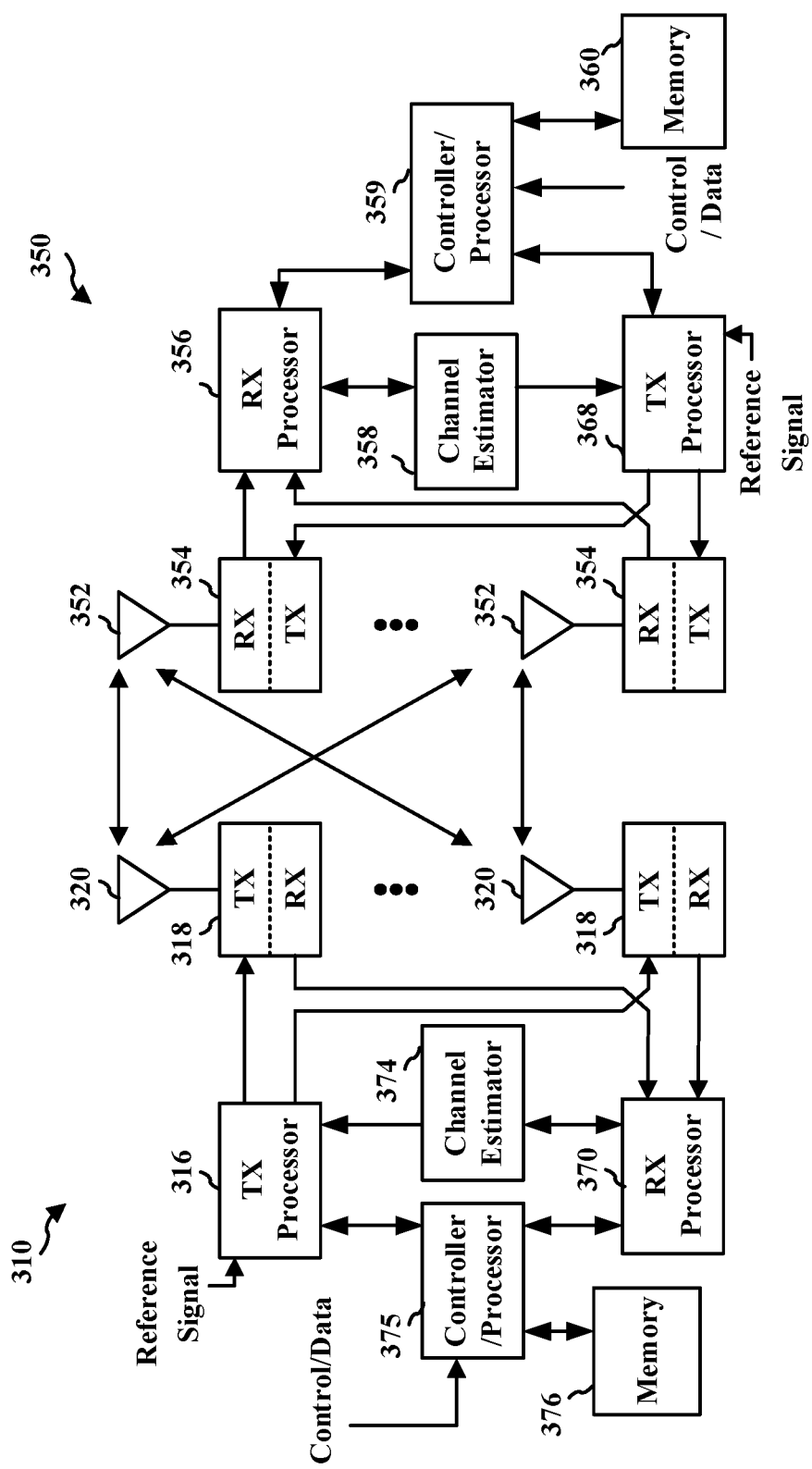
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

In wireless communications, base stations and UEs send different notification and paging signals to each other in order to facilitate communication. These signals can help to improve the overall communication system information, as well as to improve the access and control of each device within the wireless system. In some instances, a WUS can be sent from a base station to a UE operating in DRX in order to provide notification of an upcoming PO. When sending and receiving multiple WUSs and POs, it can be beneficial to conserve the wireless resources and battery usage due to an amount of WUSs and POs that are used throughout the wireless system. By doing so, the overall power consumption of the wireless devices can be improved. However, some UEs, such as NB-IoT devices, may experience issues with page reception due to signal fading. The idle mode page reception of NB-IoT devices may be limited by deep fades, and, as such, the network may schedule a large number of WUS and/or page repetitions in order for NB-IoT devices to have reliable paging.

Figure 4:
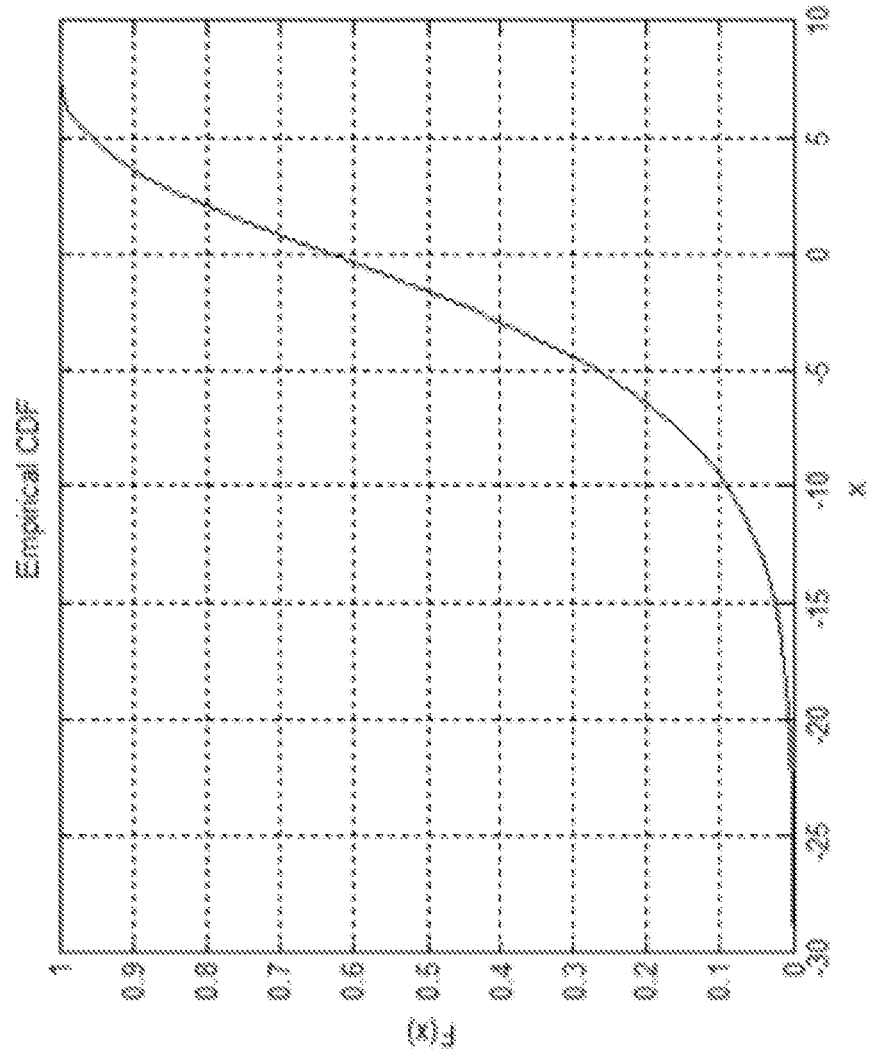
FIG. 4 is a diagram illustrating an example of fading gain distribution.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. The idle mode page receptions for NB-IoT devices may be problematic in fading scenarios. For example, the diagram 400 of FIG. 4, provides an example distribution of a single path fading channels. NB channels may essentially be a single tap channels, and may lack frequency diversity. Typical NB applications may be low Doppler scenarios and time diversity may also be limited within a DRX cycle.

The distribution of the instantaneous fade, shown in diagram 400 of FIG. 4, may be a cumulative distribution function of the instantaneous fading gain. Designing a system to handle a 1% outage means that the network would need to account for instantaneous fades of up to −25 dBs. Current 3GPP specifications require a 1% narrowband physical downlink control channel (NPDCCH) miss probability, and designing such a system may consume increased amounts of UE and/or network resources. For example, the UE would need to receive a high amount of repetitions, and the network would need to transmit the high amount of repetitions, which may place a strain on the network and the UE. The UE may also experience an increase in power consumption due to receiving the high amount of repetitions, which may lead to reduced battery lifetime. However, a system configured to handle an increased outage may not have to account for drastic instantaneous fades of up to −25 dBs. For example, a system having a 10% outage would need to be able to account for instantaneous fades of up to −10 dBs, which is a difference of up to 15 dBs in comparison to the system having the 1% outage. Thus, having a system that may be configured to change its rate of outage may lead to improved paging performance for NB-IoT devices.

The network being able to adjust or configure its outage rate or the target miss rate for paging NPDCCH may improve paging performance for NB-IoT devices. For example, the network may be configured to advertise or broadcast the target miss rate that the network is expecting UEs to perform. As such, UEs may be able to make use of the target miss rate, advertised or transmitted by the network, and optimize the paging performance which may reduce their power consumption. UEs, based on the advertised target miss rate, may be able to optimize and/or reduce the number of WUS receptions required to be monitored in each DRX cycle. This may result in a power savings to the UEs. In addition, UEs may be able to experience early termination of paging CSS based on the target miss rate. In some instances, having an increased target miss rate (e.g., 10%) may allow UEs to receive for a shorter duration of time, in comparison to say a 1% target miss rate. Receiving a smaller or reduced set of repetitions in the shorter duration of time, may allow UEs to have a reduced active or DRX ON time period.

Figure 5:
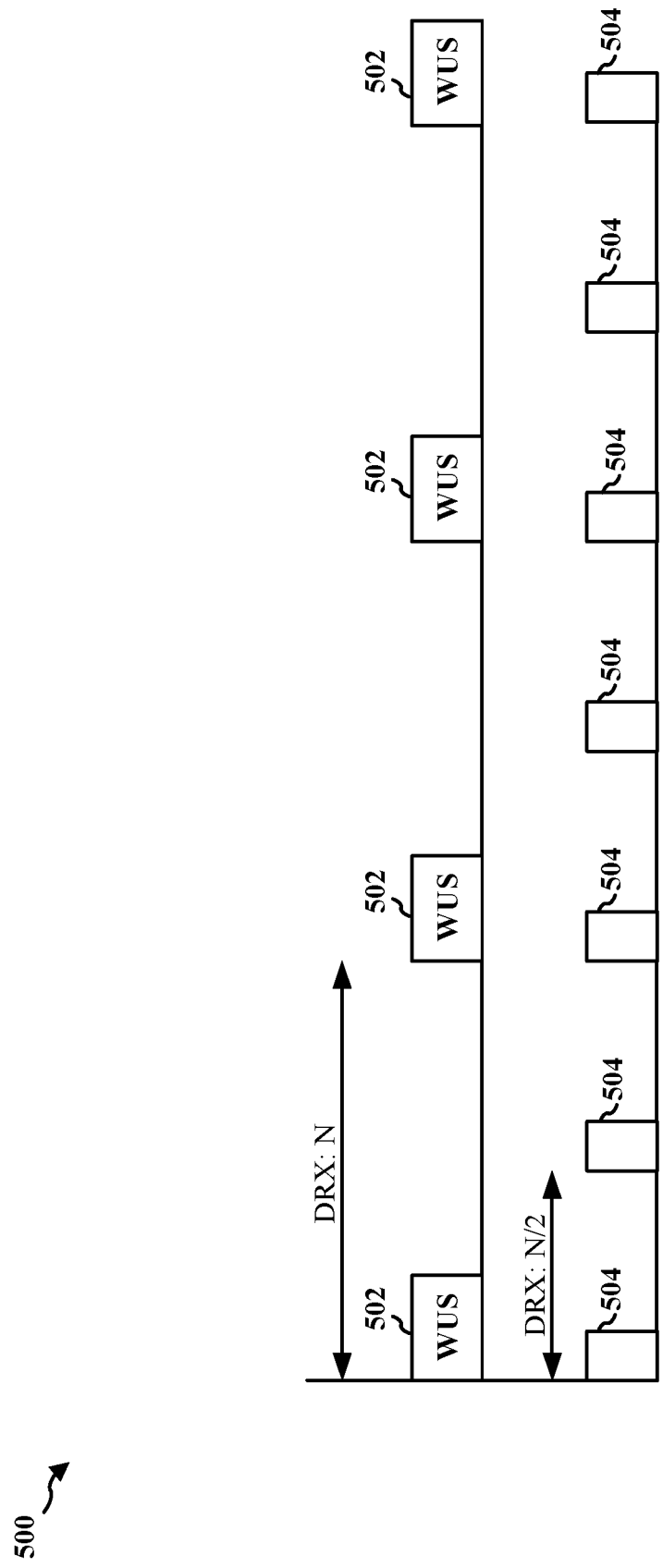
FIG. 5 is a diagram illustrating DRX cycles in accordance with certain aspects of the disclosure.

For example, with reference FIG. 5, the diagram 500 includes an example of a DRX cycle having a DRX period of N and WUS 502. The WUS 502 is the active time or DRX ON time in which a UE may be activated to receive data. The diagram 500 also includes another DRX cycle having a DRX period of N/2 and WUS 504. The DRX cycle having the WUS 504 may correspond to the network that changes its target miss rate to 10% from 1%, for example, while the DRX cycle having WUS 502 has a target miss rate of 1%. The UE, in the network having the 10% target miss rate, may effectively attain the same 1% reliability by halving the DRX cycle of the network. Thus, by adjusting the target miss rate to 10% and repeating the page across two DRX cycles, for example, the UE may be able to achieve the same target miss rate of 1% and have the same latency as the DRX cycle having WUS 502.

Figure 6:
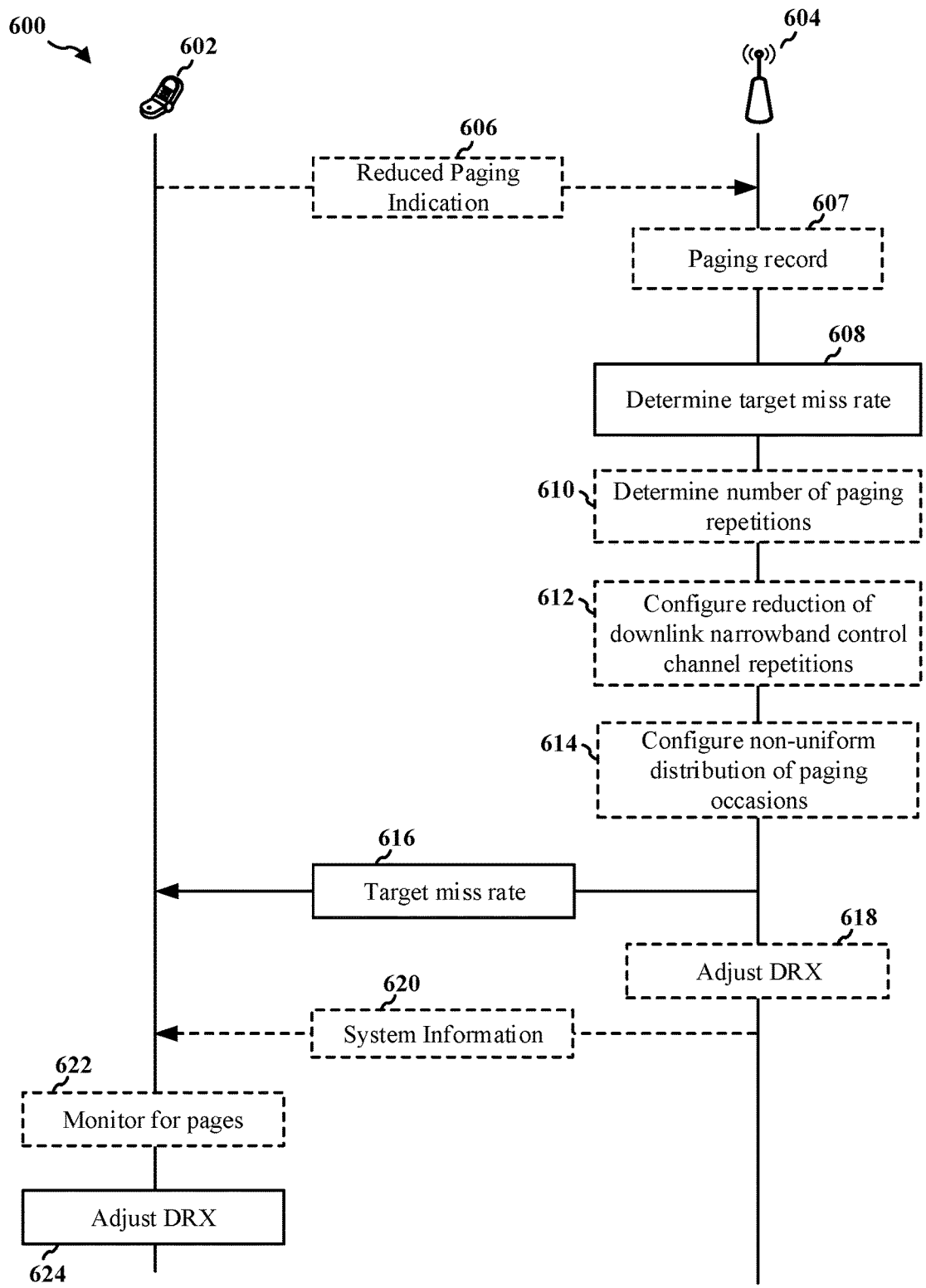
FIG. 6 is a call flow diagram of signaling between a UE and a base station in accordance with certain aspects of the disclosure.

FIG. 6 is a call flow diagram of signaling between a UE and a base station in accordance with certain aspects of the disclosure. The diagram 600 of FIG. 6 includes a UE 602 and a base station 604. The base station 604 may be configured to provide a cell. The UE 602 may be a NB-IoT device configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350. Optional aspects are illustrated with a dashed line.

In some aspects, the UE 602 may be configured to operate at a reduced or relaxed paging performance, in an effort to improve page reception of narrowband control channels, e.g., NPDCCH. The UE 602 may be configured to provide an indication to the base station 604 regarding its capabilities. As such, in some aspects, the UE may transmit a reduced paging indication 606 to the base station 604. The reduced paging indication 606 may include the capability of the UE 602 to support reduced paging. The reduced paging indication may correspond to at least one coverage enhancement (CE) level.

In some aspects, for example at 608, the base station 604 may be configured to determine a target miss rate for paging on a downlink narrowband control channel. The base station 604 may receive the reduced paging indication 606 from the UE 602, which indicates that the UE supports reduced paging. In some aspects, the base station may receive, from a network (not shown), a paging record 607 indicating that the UE is in a reduced paging mode. The base station 604 may adjust a target miss rate in response to receiving the paging record from the network. In some aspects, the base station may determine the target miss rate based on the reduced paging indication. In some aspects, the target miss rate may be selected from a set of target miss rates. An example set of target miss rates may include 1%, 10%, and/or 20%. However, the set of target miss rates may include additional target miss rates that may be greater than or lesser than the examples provided herein and the disclosure is not intended to be limited to the aspects disclosed herein.

At 610, for example, the base station may be configured to determine a number of paging repetitions for the UE. In some aspects, the number of paging repetitions may be based on the reduced paging indication, while in other aspects, the number of paging repetitions may be based on the target miss rate.

At 612, for example, the base station may be configured to configure a reduction of downlink narrowband control channel repetitions based on at least one of the reduced paging indication and the target miss rate.

At 614, for example, the base station may be configured to configure a non-uniform distribution of paging occasions. In some aspects, the base station may transmit paging transmissions to the UE during a DRX cycle based on the non-uniform distribution of paging occasions.

At 616, for example, the base station may transmit an indication of the target miss rate to at least the UE 602. In some aspects, the base station may transmit the indication of the target miss rate to one or more UEs. The UE receives, from the base station, the indication of the target miss rate for the downlink narrowband control channel. In some aspects, the indication of the target miss rate may be transmitted in system information (e.g., 620) from the base station.

In some aspects, for example, at 618, the base station may be configured to adjust a DRX configuration for the one or more UEs based on the target miss rate. For example, to adjust the DRX configuration, the base station may reduce a number of DRX ON periods. In some aspects, the base station may reduce page monitoring on the downlink narrowband control channel in order to adjust the DRX configuration. The adjusted DRX configuration may be transmitted to the base station in system information 620, which may also include additional configurations.

The UE receives the target miss rate in either the indication of the target miss rate 616 and/or the system information 620. In some aspects, the indication of the target miss rate may be received in a configuration for the UE. The UE, at 624, may be configured to adjust some of its settings in response to receiving the indication of the target miss rate, such as but not limited to adjusting the DRX configurations. For example, the UE may adjust a DRX cycle based on the target miss rate for the narrowband downlink control channel. In some aspects, the UE may adjust a number of WUS monitoring occasions based on the target miss rate. In such aspects, the UE may reduce the number of DRX ON periods or reduce the page monitoring for the downlink narrowband control channel, in order to adjust the WUS monitoring occasions. In some aspects, the UE may receive a reduction of downlink narrowband control channel repetitions, from the base station, based on the target miss rate. The UE may further receive a configuration for non-uniform distribution of paging occasions, from the base station, which may correspond to the target miss rate. The UE, for example, at 622, may be configured to monitor for pages during the non-uniform distribution of paging occasions. In some aspects, the UE may be configured to terminate monitoring a paging common search space (CSS) early, based on the target miss rate.

Figure 7:
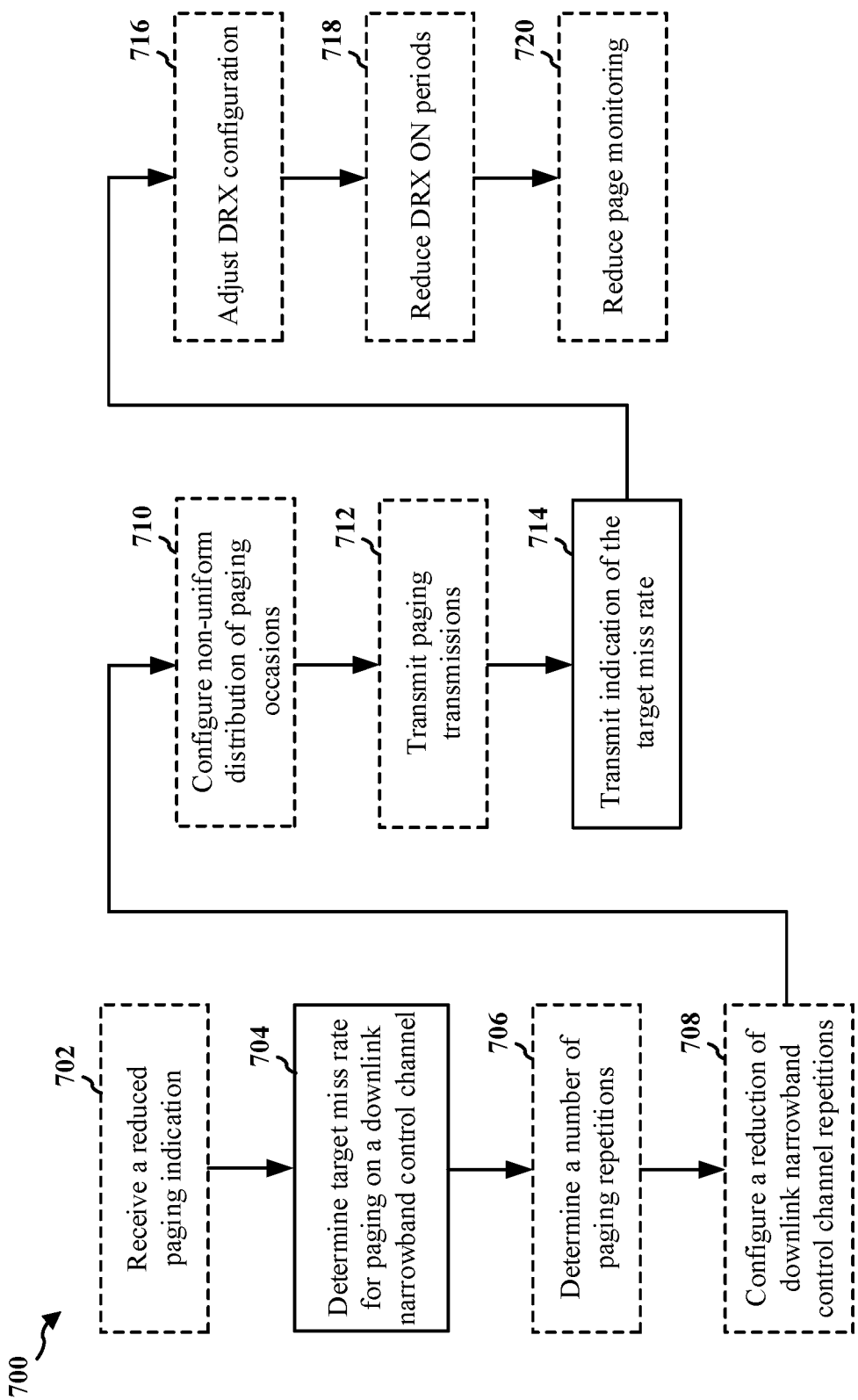
FIG. 7 is a flowchart of a method of wireless communication.

FIG. 7 is a flowchart 700 of a method of wireless communication. The method may be performed by a base station or a component of a base station (e.g., the base station 102/180, 604; the apparatus 802; the baseband unit 804, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may enable a base station to adjust an error rate for paging and to advertise such error rate to UEs, in order to optimize or reduce network paging resources.

In some aspects, for example at 702, the base station may receive a reduced paging indication. For example, 702 may be performed by reception component 830 of apparatus 802. The reduced paging indication may indicate that a UE supports reduced paging. In some aspects, the base station may receive, from the network, a paging record indicating that the UE is in a reduced paging mode. The base station may adjust the target miss rate in response to receiving the paging record from the network. In some aspects, the base station may receive an indication from the UE that informs the base station about the UE's support for reduced paging.

At 704, the base station may determine a target miss rate for paging on a downlink narrowband control channel. For example, 704 may be performed by target miss rate component 840 of apparatus 802. In some aspects, the target miss rate may be determined based on the reduced paging indication. In some aspects, the target miss rate may be selected from a set of target miss rates. For example, the set of target miss rates may include 1%, 10%, or 20%. The set of target miss rates may include other values that may be greater or less than any of the example target miss rates disclosed herein, such that the disclosure is not intended to be limited to the sample target miss rates included herein.

In some aspects, for example at 706, the base station may determine a number of paging repetitions for the UE based on at least one of the reduced paging indication or the target miss rate. For example, 706 may be performed by paging component 842 of apparatus 802. In some aspects, the base station may be configured to adjust an Rmax based on the target miss rate. For example, Rmax may be set at 128 for UEs with a target miss rate of 1%, while Rmax may be set at 16 for UEs with a target miss rate of 10%. Rmax may be set to other values at various target miss rates and is not intended to be limited to the aspects disclosed herein.

In some aspects, for example at 708, the base station may configure a reduction of downlink narrowband control channel repetitions. For example, 708 may be performed by repetition component 844 of apparatus 802. The base station may configure the reduction of downlink narrowband control channel repetitions based on at least one of the reduced paging indication and the target miss rate. In some aspects, the base station may be configured to set the number of repetitions when the UE is paged.

In some aspects, for example at 710, the base station may configure a non-uniform distribution of paging occasions. For example, 710 may be performed by non-uniform distribution component 846 of apparatus 802. In some aspects, to obtain a similar performance, a UE may be configured with a lower DRX cycle and a larger BLER, e.g., instead of 2.56 seconds DRX cycle with 1% BLER, the UE may be configured to have a 1.28 seconds DRX cycle with 10% BLER. In some aspects, for example for larger DRX cycles, the UE may be configured to have the non-uniform distribution of monitored paging occasions. For example, for a 10.24 seconds DRX cycle, instead of configuring the UE with a 5.12 seconds DRX cycle, the UE may be configured with a 10.24 seconds DRX cycle plus a retransmission paging occasion 1.28 seconds after. At least one advantage is that the UE may go to deep sleep for a longer time, while achieving the same performance. The non-uniform distribution of paging occasions may allow the network to achieve the same target miss rate and latency while reducing the use of network resources. In some aspects, the network may achieve the same target miss rate by repeating NPDCCH over two DRX cycles. In some aspects, the network may achieve the same latency by halving the DRX cycle.

In some aspects, for example at 712, the base station may transmit paging transmissions to the UE during a DRX cycle. For example, 712 may be performed by paging transmission component 848 of apparatus 802. The base station may transmit paging transmissions to the UE during the DRX cycle based on the non-uniform distribution of paging occasions. The non-uniform distribution of paging occasions may allow the UE to remain in an inactive or DRX OFF period.

At 714, the base station may transmit an indication of the target miss rate. For example, 714 may be performed by indication component 850 of apparatus 802. The base station may transmit an indication of the target miss rate to one or more UEs. In some aspects, the indication of the target miss rate may be transmitted in system information (e.g., SIB, RRC) from the base station. For example, when the one or more UEs camp onto the cell associated with the base station, the one or more UEs may read from SIB whether the base station supports a relaxed paging performance, which may lead to the base station transmitting the indication of the target miss rate to the one or more UEs.

In some aspects, for example at 716, the base station may adjust a DRX configuration for the one or more UEs. For example, 716 may be performed by DRX configuration component 852 of apparatus 802. The base station may adjust a DRX configuration for the one or more UEs based on the target miss rate. In some aspects, the period of the DRX configuration may be reduced based on the target miss rate. The network may achieve the same target miss rate by repeating the NB downlink control channel over more than one DRX cycle.

In some aspects, for example, at 718, the base station may reduce a number of DRX ON periods. For example, 718 may be performed by reduction component 854 of apparatus 802. The base station may reduce a number of DRX ON periods to adjust the DRX configuration. The reduction of DRX ON periods may result in the UE missing pages while the UE is in a DRX OFF period. The increase in the target miss rate may allow the UE to miss such pages while in DRX OFF period, which may result in an overall savings of DRX ON time while achieving the same performance.

In some aspects, for example, at 720, the base station may reduce page monitoring on the downlink narrowband control channel. For example, 720 may be performed by reduction component 854 of apparatus 802. The base station may reduce page monitoring on the downlink narrowband control channel to adjust the DRX configuration. In some aspects, the base station may reduce the amount of subframes for the WUS to reduce the page monitoring.

Figure 8:
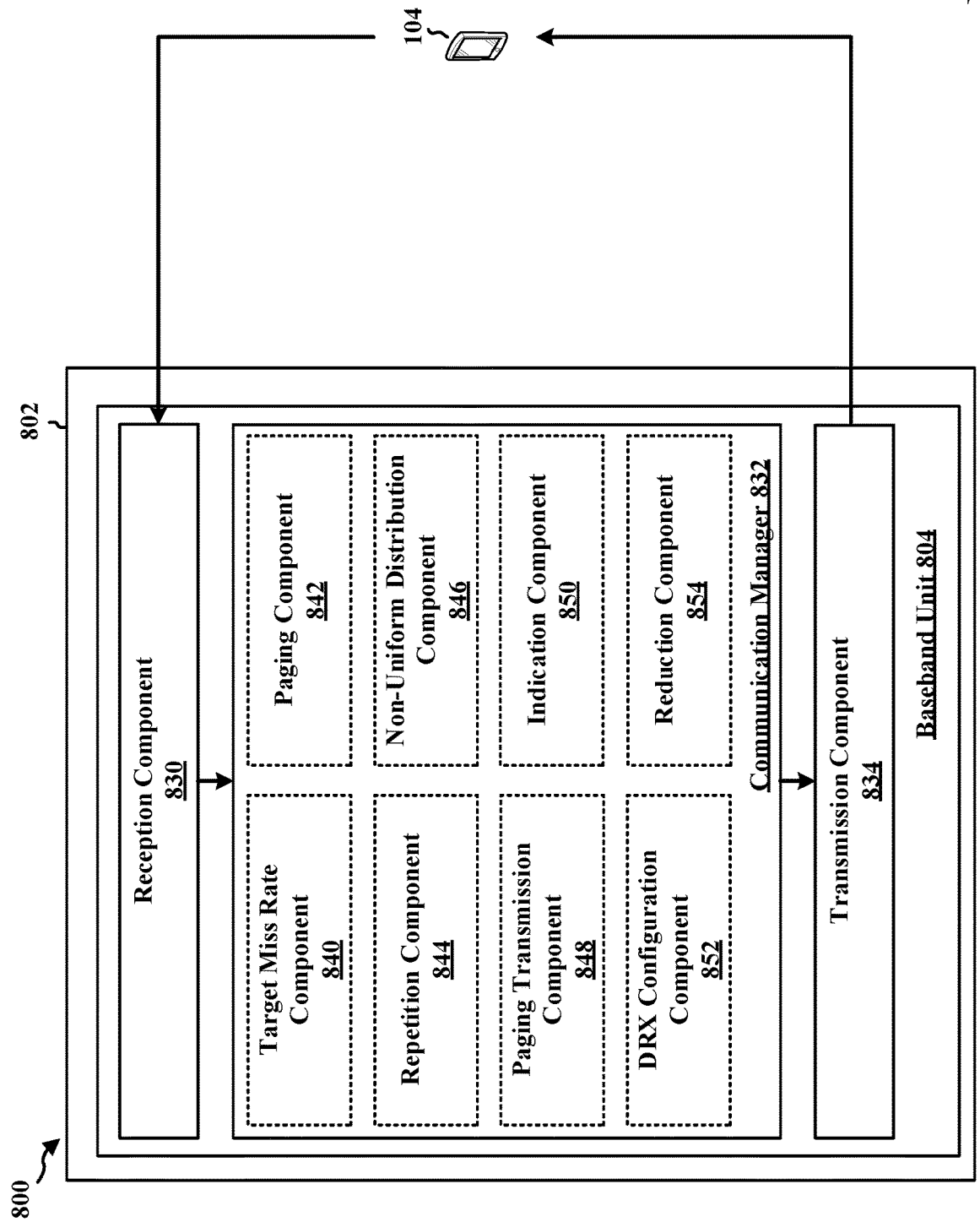
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 and may include the memory 376 and/or at least one of the TX processor 316, the RX processor 370, and the controller/processor 375.

The communication manager 832 includes a target miss rate component 840 that may determine a target miss rate for paging on a downlink narrowband control channel, e.g., as described in connection with 704 of FIG. 7. The communication manager 832 further includes a paging component 842 that may determine a number of paging repetitions for the UE, e.g., as described in connection with 706 of FIG. 7. The communication manager 832 further includes a repetition component 844 that may configure the reduction of downlink narrowband control channel repetitions, e.g., as described in connection with 708 of FIG. 7. The communication manager 832 further includes a non-uniform distribution component 846 that may configure a non-uniform distribution of paging occasions, e.g., as described in connection with 710 of FIG. 7. The communication manager 832 further includes a paging transmission component 848 that may transmit paging transmissions to the UE during the DRX cycle, e.g., as described in connection with 712 of FIG. 7. The communication manager 832 further includes an indication component 850 that may transmit the indication of the target miss rate to one or more UEs, e.g., as described in connection with 714 of FIG. 7. The communication manager 832 further includes a DRX configuration component 852 that may adjust the DRX configuration for the one or more UEs, e.g., as described in connection with 716 of FIG. 7. The communication manager 832 further includes a reduction component 854 that, in some aspects, may reduce the number of DRX ON periods, e.g., as described in connection with 718 of FIG. 7. The reduction component 854, in some aspects, may reduce page monitoring on the downlink narrowband control channel, e.g., as described in connection with 720 of FIG. 7. In some aspects, the reception component 830 may be configured to receive the reduced paging indication, e.g., as described in connection with 702 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for determining a target miss rate for paging on a downlink narrowband control channel. The apparatus includes means for transmitting an indication of the target miss rate to one or more UEs. The apparatus further includes means for adjusting a DRX configuration for the one or more UEs based on the target miss rate. The apparatus further includes means for reducing a number of DRX ON periods. The apparatus further includes means for reducing page monitoring on the downlink narrowband control channel. The apparatus further includes means for receiving a reduced paging indication, wherein the reduced paging indication indicates that a UE supports reduced paging. The apparatus further includes means for determining a number of paging repetitions for the UE based on at least one of the reduced paging indication or the target miss rate. The apparatus further includes means for configuring a reduction of downlink narrowband control channel repetitions based on at least one of the reduced paging indication and the target miss rate. The apparatus further includes means for configuring a non-uniform distribution of paging occasions. The apparatus further includes means for transmitting paging transmissions to the UE during a DRX cycle based on the non-uniform distribution of paging occasions. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
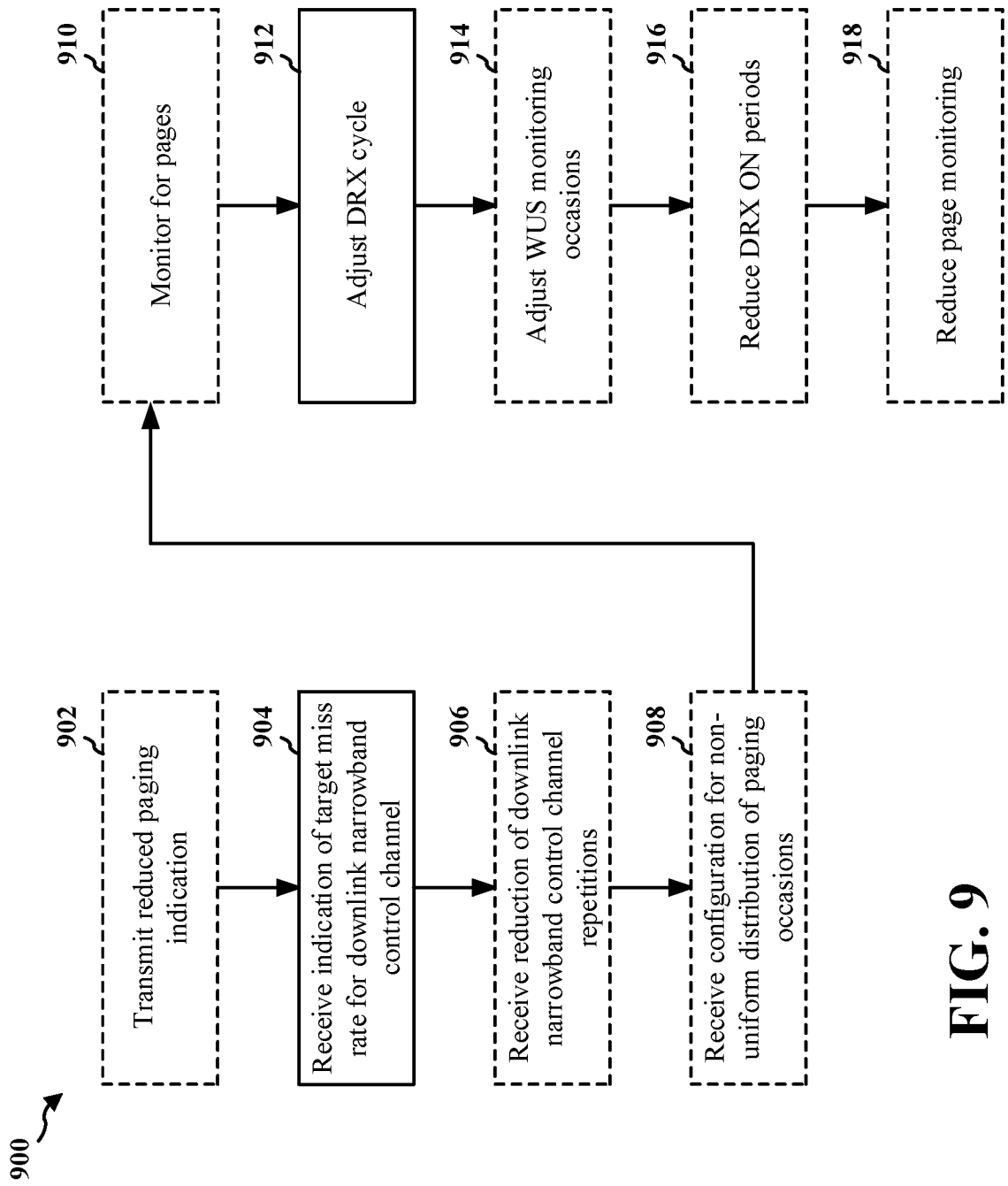
FIG. 9 is a flowchart of a method of wireless communication.

FIG. 9 is a flowchart 900 of a method of wireless communication. The method may be performed by a UE or a component of a UE (e.g., the UE 104, 602; the apparatus 1002; the cellular baseband processor 1004, which may include the memory 360 and which may be the entire UE 350 or a component of the UE 350, such as the Tx processor 368, the RX processor 356, and/or the controller/processor 359). One or more of the illustrated operations may be omitted, transposed, or contemporaneous. Optional aspects are illustrated with a dashed line. The method may allow a UE to reduce power consumption by reducing the number of network paging monitored in DRX cycles.

In some aspects, for example at 902, the UE may transmit a reduced paging indication to the base station. For example, 902 may be performed by reduced paging component 1040 of apparatus 1002. In some aspects, the reduced paging indication may include the capability of the UE being configured to support reduced paging. The reduced paging indication may correspond to at least one coverage enhancement (CE) level. For example, the target miss rate may be selectively defined for each coverage level of the UE.

At 904, the UE may receive an indication of a target miss rate for a downlink narrowband control channel. For example, 904 may be performed by target miss rate component 1042 of apparatus 1002. The UE may receive the indication of the target miss rate for the downlink narrowband control channel from a base station. In some aspects, the UE may be configured to terminate monitoring a paging common search space (CSS) early based on the target miss rate. In some aspects, the indication of the target miss rate may be received in system information from the base station. In some aspects, the indication of the target miss rate may be received in a configuration for the UE.

In some aspects, for example at 906, the UE may receive a reduction of downlink narrowband control channel repetitions from the base station. For example, 906 may be performed by repetition component 1044 of apparatus 1002. The reduction of downlink narrowband control channel repetitions may be based on the target miss rate. In some aspects, the base station may be configured to set the number of repetitions when the UE is paged.

In some aspects, for example at 908, the UE may receive a configuration for non-uniform distribution of paging occasions. For example, 908 may be performed by configuration component 1046 of apparatus 1002. The UE may receive the configuration for non-uniform distribution of paging occasions from the base station. The configuration for non-uniform distribution of paging occasions may correspond to the target miss rate. The non-uniform distribution of paging occasions may allow the UE to achieve the same target miss rate and latency while reducing the power consumption of the UE.

In some aspects, for example at 910, the UE may monitor for pages during the non-uniform distribution of paging occasions. For example, 910 may be performed by monitor component 1048 of apparatus 1002. The non-uniform distribution of paging occasions may allow the UE to remain in or extend the time the UE is inactive or in DRX OFF period.

At 912, the UE may adjust a DRX cycle based on the target miss rate for the narrowband downlink control channel. For example, 912 may be performed by DRX cycles component 1050 of apparatus 1002. In some aspects, the period of the DRX configuration may be reduced based on the target miss rate. In some aspects, to obtain a similar performance, a UE may be configured with a lower DRX cycle and a larger BLER, e.g., instead of 2.56 seconds DRX cycle with 1% BLER, the UE may be configured to have a 1.28 seconds DRX cycle with 10% BLER.

In some aspects, for example at 914, the UE may adjust a number of wakeup signal (WUS) monitoring occasions based on the target miss rate. For example, 914 may be performed by WUS component 1052 of apparatus 1002. In some aspects, the WUS monitoring occasions may be reduced by reducing the amount of subframes for the WUS.

In some aspects, for example at 916, the UE, in some aspects, may reduce the number of DRX ON periods. For example, 916 may be performed by reduction component 1054 of apparatus 1002. The UE, in some aspects, may reduce the number of DRX ON periods in order to adjust the number of WUS monitoring occasions. The reduction of DRX ON periods may result in the UE missing pages while the UE is in a DRX OFF period. The increase in the target miss rate may allow the UE to miss such pages while in DRX OFF period, which may result in an overall savings of DRX ON time while achieving the same performance.

In some aspects, for example at 918, the UE, in some aspects, may reduce the page monitoring for the downlink narrowband control channel. For example, 918 may be performed by reduction component 1054 of apparatus 1002. The UE, in some aspects, may reduce the page monitoring for the downlink narrowband control channel in order to adjust the number of WUS monitoring occasions, In some aspects, the page monitoring for the downlink narrowband control channel may be reduced by reducing the amount of subframes for the WUS.

Figure 10:
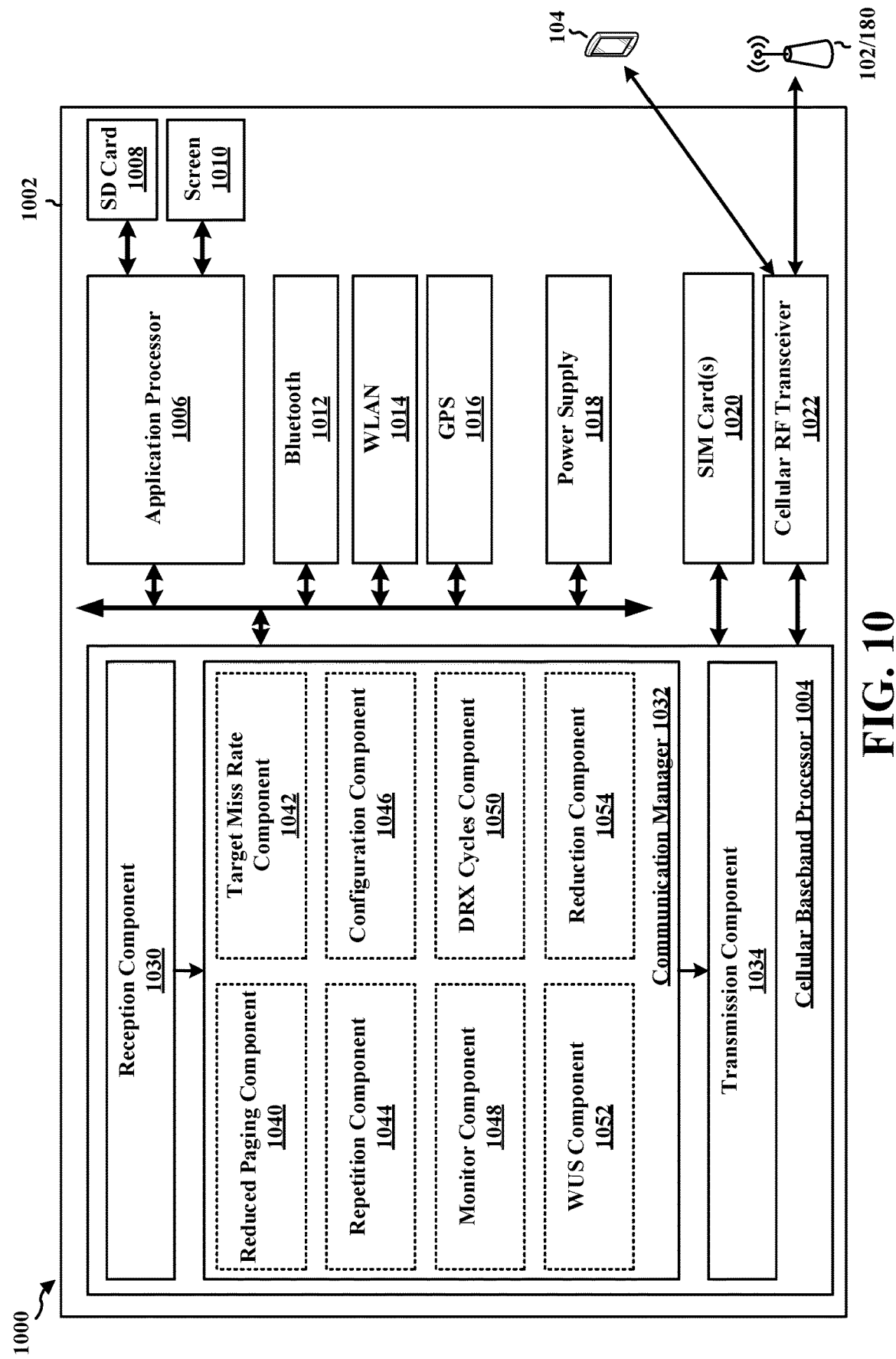
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a reduced paging component 1040 that may be configured to transmit the reduced paging indication to the base station, e.g., as described in connection with 902 of FIG. 9. The communication manager 1032 further includes a target miss rate component 1042 may be configured to receive the indication of the target miss rate for the downlink narrowband control channel, e.g., as described in connection with 904 of FIG. 9. The communication manager 1032 further includes a repetition component 1044 that may be configured receive a reduction of downlink narrowband control channel repetitions based on the target miss rate, e.g., as described in connection with 1006 of FIG. 10. The communication manager 1032 further includes a configuration component 1046 that may be configured to receive a configuration for non-uniform distribution of paging occasions corresponding to the target miss rate, e.g., as described in connection with 908 of FIG. 9. The communication manager 1032 further includes a monitor component 1048 that may be configured to monitor for pages during the non-uniform distribution of paging occasions, e.g., as described in connection with 910 of FIG. 9. The communication manager 1032 further includes a DRX cycles component 1050 that may be configured to adjust the DRX cycle based on the target miss rate for the narrowband downlink control channel, e.g., as described in connection with 912 of FIG. 9. The communication manager 1032 further includes a WUS component 1052 that may be configured to adjust the number of WUS monitoring occasions based on the target miss rate, e.g., as described in connection with 914 of FIG. 9. The communication manager 1032 further includes a reduction component 1054 that, in some aspects, may be configured to reduce the number of DRX ON periods, e.g., as described in connection with 916 of FIG. 9. In some aspects, the reduction component 1054, may be configured to reduce the page monitoring for the downlink narrowband control channel, e.g., as described in connection with 918 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, an indication of a target miss rate for a downlink narrowband control channel. The apparatus includes means for adjusting a DRX cycle based on the target miss rate for the narrowband downlink control channel. The apparatus further includes means for adjusting a number of WUS monitoring occasions based on the target miss rate. The apparatus further includes means for reducing a number of DRX ON periods. The apparatus further includes means for reducing a page monitoring for the downlink narrowband control channel. The apparatus further includes means for transmitting a reduced paging indication to the base station, wherein the reduced paging indication includes the capability of the UE to support reduced paging. The apparatus further includes means for receiving a reduction of downlink narrowband control channel repetitions, from the base station, based on the target miss rate. The apparatus further includes means for receiving a configuration for non-uniform distribution of paging occasions, from the base station, corresponding to the target miss rate. The apparatus further includes means for monitoring for pages during the non-uniform distribution of paging occasions. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a base station comprising determining a target miss rate for paging on a downlink narrowband control channel; and transmitting an indication of the target miss rate to one or more UEs.

In Example 2, the method of Example 1 further includes that the target miss rate is selected from a set of target miss rates.

In Example 3, the method of Example 1 or 2 further includes adjusting a discontinuous reception (DRX) configuration for the one or more UEs based on the target miss rate.

In Example 4, the method of any of Examples 1-3 further includes reducing a number of DRX ON periods; or reducing page monitoring on the downlink narrowband control channel.

In Example 5, the method of any of Examples 1-4 further includes receiving a reduced paging indication, wherein the reduced paging indication indicates that a UE supports reduced paging, and wherein the target miss rate is determined based on the reduced paging indication.

In Example 6, the method of any of Examples 1-5 further includes that the reduced paging indication comprises a paging record for the UE that is received from a network.

In Example 7, the method of any of Examples 1-6 further includes determining a number of paging repetitions for the UE based on at least one of the reduced paging indication or the target miss rate.

In Example 8, the method of any of Examples 1-7 further includes configuring a reduction of downlink narrowband control channel repetitions based on at least one of the reduced paging indication and the target miss rate.

In Example 9, the method of any of Examples 1-8 further includes configuring a non-uniform distribution of paging occasions; and transmitting paging transmissions to the UE during a DRX cycle based on the non-uniform distribution of the paging occasions.

In Example 10, the method of any of Examples 1-9 further includes that the indication is transmitted in system information from the base station.

Example 11 is a device including one or more processors and one or more memories in electronic communication with the one or more processors storing instructions executable by the one or more processors to cause the system or apparatus to implement a method as in any of Examples 1-10.

Example 12 is a system or apparatus including means for implementing a method or realizing an apparatus as in any of Examples 1-10.

Example 19 is a non-transitory computer readable medium storing instructions executable by one or more processors to cause the one or more processors to implement a method as in any of Examples 1-10.

Example 20 is a method of wireless communication at a user equipment (UE) comprising receiving, from a base station, an indication of a target miss rate for a downlink narrowband control channel; and adjusting a DRX cycle based on the target miss rate for the downlink narrowband control channel.

In Example 21, the method of Example 20 further includes adjusting a number of WUS monitoring occasions based on the target miss rate.

In Example 22, the method of Examples 20 or 21 further includes reducing a number of DRX ON periods; or reducing a page monitoring for the downlink narrowband control channel.

In Example 23, the method of any of Examples 20-22 further includes that the UE terminates monitoring a paging CSS early based on the target miss rate.

In Example 24, the method of any of Examples 20-23 further includes transmitting a reduced paging indication to the base station, wherein the reduced paging indication includes a capability of the UE to support reduced paging.

In Example 25, the method of any of Examples 20-24 further includes that the indication of the target miss rate is received in a configuration for the UE, and wherein the reduced paging indication corresponds to at least one CE level.

In Example 26, the method of any of Examples 20-25 further includes that the indication of the target miss rate is received in system information from the base station.

In Example 27, the method of any of Examples 20-26 further includes receiving a reduction of downlink narrowband control channel repetitions, from the base station, based on the target miss rate.

In Example 28, the method of any of Examples 20-27 further includes receiving a configuration for non-uniform distribution of paging occasions, from the base station, corresponding to the target miss rate; and monitoring for pages during the non-uniform distribution of the paging occasions.

Example 29 is a device including one or more processors and one or more memories in electronic communication with the one or more processors storing instructions executable by the one or more processors to cause the system or apparatus to implement a method as in any of Examples 20-28.

Example 30 is a system or apparatus including means for implementing a method or realizing an apparatus as in any of Examples 20-28.

Example 31 is a non-transitory computer readable medium storing instructions executable by one or more processors to cause the one or more processors to implement a method as in any of Examples 20-28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   receiving, from a base station, a configuration indicating a target miss rate for a downlink narrowband control channel, the target miss rate corresponding to a rate at which the UE is allowed to miss a number of pages during at least a portion of a discontinuous reception (DRX) cycle; and
   adjusting a number of wakeup signal (WUS) monitoring occasions in the DRX cycle based on the target miss rate for the downlink narrowband control channel.

2. The method of claim 1, wherein the adjusting the number of WUS monitoring occasions comprises:
   reducing a number of DRX ON periods in the DRX cycle; or
   reducing a page monitoring in the DRX cycle for the downlink narrowband control channel.

3. The method of claim 1, wherein the UE terminates monitoring a paging common search space (CSS) early based on the target miss rate.

4. The method of claim 1, further comprising:
   transmitting, to the base station, a reduced paging indication, wherein the reduced paging indication includes a capability of the UE to support reduced paging.

5. The method of claim 4, wherein the reduced paging indication corresponds to at least one coverage enhancement (CE) level.

6. The method of claim 1, wherein the target miss rate is received in system information from the base station.

7. The method of claim 1, further comprising:
   receiving, from the base station, a reduction of downlink narrowband control channel repetitions based on the target miss rate.

8. The method of claim 1, further comprising:
   receiving, from the base station, a configuration for non-uniform distribution of paging occasions corresponding to the target miss rate; and
   monitoring for pages during the non-uniform distribution of the paging occasions.

9. An apparatus for wireless communication at a user equipment (UE), comprising:
   a transceiver;
   at least one processor; and
   a memory, coupled to the transceiver and to the at least one processor, storing instructions thereon, which when executed by the at least one processor, cause the apparatus to:
      receive, from a base station, via the transceiver, a configuration indicating a target miss rate for a downlink narrowband control channel, the target miss rate corresponding to a rate at which the UE is allowed to miss a number of pages during at least a portion of a discontinuous reception (DRX) cycle; and
      adjust a number of wakeup signal (WUS) monitoring occasions in the DRX cycle based on the target miss rate for the downlink narrowband control channel.

10. The apparatus of claim 9, wherein the instructions causing the apparatus to adjust a number of WUS monitoring occasions further cause the apparatus to:
    reduce a number of DRX ON periods in the DRX cycle; or
    reduce a page monitoring in the DRX cycle for the downlink narrowband control channel.

11. The apparatus of claim 9, wherein the UE terminates monitoring a paging common search space (CSS) early based on the target miss rate.

12. The apparatus of claim 9, wherein the instructions, which when executed by the at least one processor, further cause the apparatus to transmit, to the base station, via the transceiver, a reduced paging indication, wherein the reduced paging indication includes a capability of the UE to support reduced paging, and wherein the reduced paging indication corresponds to at least one coverage enhancement (CE) level.

13. The apparatus of claim 9, wherein the target miss rate is received in system information from the base station.

14. The apparatus of claim 9, wherein the instructions, which when executed by the at least one processor, further cause the apparatus to:
    receive, from the base station, via the transceiver, a reduction of downlink narrowband control channel repetitions based on the target miss rate.

15. The apparatus of claim 9, wherein the instructions, which when executed by the at least one processor, further cause the apparatus to:

receive, from the base station, via the transceiver, a configuration for non-uniform distribution of paging occasions corresponding to the target miss rate; and monitor for pages during the non-uniform distribution of paging occasions.

16. A non-transitory computer-readable medium storing computer executable code, the code when executed by a processor cause the processor to:

receive, from a base station, a configuration indicating a target miss rate for a downlink narrowband control channel, the target miss rate corresponding to a rate at which a user equipment (UE) is allowed to miss a number of pages during at least a portion of a discontinuous reception (DRX) cycle; and adjust a number of wakeup signal (WUS) monitoring occasions in the DRX cycle based on the target miss rate for the downlink narrowb and control channel.

17. The non-transitory computer-readable medium of claim 16, wherein the code causing the processor to adjust a number of WUS monitoring occasions further causes the processor to:

reduce a number of DRX ON periods in the DRX cycle; or reduce a page monitoring in the DRX cycle for the downlink narrowband control channel.

18. The non-transitory computer-readable medium of claim 16, wherein the code, which when executed by the processor, further cause the processor to terminate monitoring a paging common search space (CSS) early based on the target miss rate.

19. The non-transitory computer-readable medium of claim 16, wherein the code, which when executed by the processor, further cause the processor to transmit, to the base station, a reduced paging indication, wherein the reduced paging indication includes a capability of the UE to support reduced paging, wherein the reduced paging indication corresponds to at least one coverage enhancement (CE) level.

20. The non-transitory computer-readable medium of claim 16, wherein the target miss rate is received in system information from the base station.

21. The non-transitory computer-readable medium of claim 16, wherein the code, which when executed by the processor, further cause the processor to:

receive, from the base station, a reduction of downlink narrowband control channel repetitions based on the target miss rate.

22. The non-transitory computer-readable medium of claim 16, wherein the code, which when executed by the processor, further cause the processor to:

receive, from the base station, a configuration for non-uniform distribution of paging occasions corresponding to the target miss rate; and monitor for pages during the non-uniform distribution of paging occasions.

23. An apparatus for wireless communication, comprising:

means for receiving, from a base station, a configuration indicating a target miss rate for a downlink narrowband control channel, the target miss rate corresponding to a rate at which a user equipment (UE) is allowed to miss a number of pages during at least a portion of a discontinuous reception (DRX) cycle; and means for adjusting a number of wakeup signal (WUS) monitoring occasions in the DRX cycle based on the target miss rate for the downlink narrowband control channel.

24. The apparatus of claim 23, wherein the means for adjusting the number of WUS monitoring occasions is further configured to:

reduce a number of DRX ON periods in the DRX cycle; or reduce a page monitoring in the DRX cycle for the downlink narrowband control channel.

25. The apparatus of claim 23, further comprising means for terminating monitoring of a paging common search space (CSS) early based on the target miss rate.

26. The apparatus of claim 23, further comprising:

means for transmitting, to the base station, a reduced paging indication, wherein the reduced paging indication includes a capability of the UE to support reduced paging, and wherein the reduced paging indication corresponds to at least one coverage enhancement (CE) level.

27. The apparatus of claim 23, wherein the target miss rate is received in system information from the base station.

28. The apparatus of claim 23, further comprising:

means for receiving, from the base station, a reduction of downlink narrowband control channel repetitions based on the target miss rate.

29. The apparatus of claim 23, further comprising:

means for receiving, from the base station, a configuration for non-uniform distribution of paging occasions corresponding to the target miss rate; and means for monitoring for pages during the non-uniform distribution of the paging occasions.

* * * * *